(12) United States Patent
Bressler

(10) Patent No.: US 9,764,721 B2
(45) Date of Patent: Sep. 19, 2017

(54) EMPTY BRAKE CYLINDER PRESSURE ADJUSTMENT ARRANGEMENT FOR AN EMPTY/LOAD VALVE

(71) Applicant: Westinghouse Air Brake Technologies Corporation, Wilmerding, PA (US)

(72) Inventor: Nicholas Lee Bressler, Export, PA (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 1 day.

(21) Appl. No.: 14/987,821

(22) Filed: Jan. 5, 2016

(65) Prior Publication Data

US 2017/0190326 A1 Jul. 6, 2017

(51) Int. Cl.
*B60T 8/18* (2006.01)

(52) U.S. Cl.
CPC .................. *B60T 8/1893* (2013.01)

(58) Field of Classification Search
CPC ........ B60T 8/1893; B60T 8/1818; B60T 8/18; B60T 8/1825; B60T 15/022; B60T 15/185
See application file for complete search history.

(56) References Cited

U.S. PATENT DOCUMENTS

| | | | |
|---|---|---|---|
| 2,170,086 A * | 8/1939 | McCune | B60T 8/26 188/355 |
| 2,320,905 A * | 6/1943 | Bateholts | F16K 11/0712 137/625.25 |
| 2,418,013 A * | 3/1947 | Cook | B60T 8/1818 137/102 |
| 2,575,943 A * | 11/1951 | Cook | B60T 8/1893 303/22.6 |
| 4,143,924 A * | 3/1979 | Coupland | B60T 8/1818 188/195 |
| 4,299,428 A * | 11/1981 | Fauck | B60T 8/1843 188/195 |
| 4,304,441 A * | 12/1981 | Fauck | B60T 8/1818 303/22.5 |
| 4,671,576 A * | 6/1987 | Fourie | B60T 8/1705 188/156 |
| 5,100,207 A | 3/1992 | McKay | |
| 5,106,168 A | 4/1992 | McKay | |
| 5,669,674 A * | 9/1997 | McKay | B60T 8/1818 303/15 |

(Continued)

FOREIGN PATENT DOCUMENTS

| | | |
|---|---|---|
| EP | 1182106 A2 | 2/2002 |
| RU | 2222444 C2 | 1/2004 |

*Primary Examiner* — Thomas J Williams
(74) *Attorney, Agent, or Firm* — The Webb Law Firm

(57) ABSTRACT

An adjustment arrangement for an empty/load valve includes a body defining a channel, an adjustment beam slidably retained within the channel, and an adjustment handle connected to the adjustment beam. The adjustment handle may be configured to move between at least two positions. The adjustment handle may be configured to move the adjustment beam to at least two positions. The adjustment handle may be connected to the adjustment beam via a pin that extends through the adjustment handle and into the adjustment beam. The adjustment beam may include a protrusion that extends from the adjustment beam to act as a contact point.

19 Claims, 12 Drawing Sheets

(56) References Cited

U.S. PATENT DOCUMENTS

| | | | |
|---|---|---|---|
| 5,934,765 A * | 8/1999 | Hart | B60T 8/1893 |
| | | | 303/22.7 |
| 7,857,398 B2 | 12/2010 | Spadaccini et al. | |
| 9,020,667 B2 | 4/2015 | Haas et al. | |
| 2009/0206651 A1 | 8/2009 | Wright | |
| 2010/0283316 A1 | 11/2010 | Carroll | |

* cited by examiner

EMPTY BRAKE CYLINDER PRESSURE ADJUSTMENT ARRANGEMENT FOR AN EMPTY/LOAD VALVE

BACKGROUND OF THE INVENTION

Field of the Invention

The present disclosure relates, in general, to empty/load valves for railway vehicles and, in particular, to a brake cylinder pressure adjustment feature for empty/load valves.

Description of Related Art

Brake equipment for railway freight cars typically employs dual capacity empty/load equipment that adjusts the brake application force according to the empty or loaded conditions of the freight car. In such dual capacity empty/load equipment, a two-setting control is provided where normal brake pressure is realized under full load conditions and a reduced or modulated brake pressure is realized under an empty load condition. In contrast, single capacity brake equipment, which produces a brake application force independent from the load condition of the car loading, is susceptible to wheel lock and sliding wheels due to the same brake force being applied to an empty car as a loaded car. Sliding wheels undesirably cause flat spots on the wheels as well as decreased brake performance. By modulating the brake pressure under empty load conditions using dual capacity empty/load equipment, the occurrence of sliding wheels is reduced or eliminated. Typically, the changeover point between the empty and load settings is selected at a predetermined car weight, such as 20% of the full load capacity weight. When freight cars are either fully loaded or completely empty, the dual capacity empty/load equipment generally functions acceptably. However, with varying load conditions, i.e., loads that are intermediate a full load and an empty condition, dual capacity empty/load equipment may not be satisfactory as cars having a partial load may be under-braked or over-braked depending on the pre-selected changeover point between the empty and load settings.

Current empty/load equipment is preset by the manufacturer and is not adjustable by the operator in the field. Since a complete disassembly of the empty/load equipment is necessary to adjust a slotted beam press or fulcrum within the empty/load equipment, the settings are preset at the manufacturing facility. Therefore, the operator is unable to adjust the settings according to his/her specific freight car when in the field. Current empty/load equipment may also include a continuous adjustment feature to adjust the settings on the empty/load equipment. However, without a setting indicator on the empty/load equipment, the set air pressure for the empty/load equipment is often unknown without supplying pressurized air to the empty/load equipment.

SUMMARY OF THE INVENTION

In view of the foregoing, a need exists for an adjustment feature for empty/load equipment that provides accurate and identifiable settings for the empty/load equipment. A further need exists for improved access to an adjustment feature for empty/load equipment to allow for improved adjustment of the empty/load equipment in the field.

Accordingly, and generally, an adjustment arrangement for an empty/load valve, an empty/load valve including an adjustment feature, and a railway vehicle having an empty/load valve with an adjustment feature are provided to address and/or overcome some or all of the deficiencies or drawbacks associated with existing empty/load valves.

According to one aspect, an adjustment arrangement for an empty/load valve may include a body defining a channel, an adjustment beam slidably retained within the channel, and an adjustment handle connected to the adjustment beam. The adjustment handle may be configured to move between at least two positions. The adjustment handle may be configured to move the adjustment beam to at least two positions.

The adjustment handle may be connected to the adjustment beam via a pin that extends through the adjustment handle and into the adjustment beam. The adjustment beam may include a protrusion that extends from the adjustment beam to act as a contact point. The adjustment handle may be configured to move between at least three positions that each correspond to a weight of a railway vehicle. The adjustment handle may be secured to the body via a fastener at each position. The adjustment handle may define at least two holes that correspond to the at least two positions of the adjustment handle. The adjustment handle may include at least one indicator provided next to each hole. The adjustment handle may define at least one dimple that is used to rotate the adjustment handle between the at least two positions. The body may include two opposing protrusions and the adjustment beam may define two opposing channels. The protrusions of the body may be received within the channels of the adjustment beam to slidably retain the adjustment beam on the body.

In another aspect, an empty/load valve for a railway vehicle may include a housing and body member, a first check valve assembly positioned within the body member, a second check valve assembly positioned within the body member, a lever configured to connect the first check valve assembly to the second check valve assembly, and an adjustment arrangement provided within the housing. The adjustment arrangement may include a body defining a channel, an adjustment beam slidably retained within the channel, and an adjustment handle connected to the adjustment beam. The adjustment handle may be configured to move between at least two positions. The adjustment handle may be configured to move the adjustment beam to at least two positions on the lever.

The adjustment beam may include a protrusion that extends from the adjustment beam to act as a contact point against the lever. The contact point may move between different heights on the lever upon movement of the adjustment beam. A sight plug may be inserted into the housing that allows an operator to view the adjustment arrangement within the housing. The adjustment handle may be connected to the adjustment beam via a pin that extends through the adjustment handle and into the adjustment beam. A sensor/damper arrangement may be provided in the housing. The adjustment arrangement may be connected to the sensor/damper arrangement. Upon movement of the first check valve assembly in a first direction, the lever may be rotated to move the second check valve assembly in an opposing second direction. The adjustment beam may act as the fulcrum point for the lever.

In another aspect, a railway vehicle may include a supply reservoir fluidly connected to a distributor valve, an empty/load valve fluidly connected to the distributor valve, and a brake cylinder fluidly connected to the empty/load valve. The empty/load valve may include a housing and body member, a first check valve assembly positioned within the body member, a second check valve assembly positioned within the body member, a lever configured to connect the first check valve assembly to the second check valve assembly, and an adjustment arrangement provided within the housing. The adjustment arrangement may include a body defining a channel, an adjustment beam slidably retained within the channel, and an adjustment handle connected to the adjustment beam. The adjustment handle may be configured to move between at least two positions. The adjustment handle may be configured to move the adjustment beam to at least two positions on the lever.

The empty/load valve may regulate an amount of pressurized fluid that is supplied to the brake cylinder by adjusting the position of the adjustment beam on the lever of the empty/load valve. A contact point extending from the adjustment beam may move between different heights on the lever upon movement of the adjustment beam to regulate an amount of pressurized fluid that is supplied from the empty/load valve. A sensor/damper arrangement may be provided in the housing. The adjustment arrangement may be connected to the sensor/damper arrangement.

These and other features and characteristics of the adjustment feature and empty/load valve for a railway vehicle will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular form of "a", "an", and "the" include plural referents unless the context clearly dictates otherwise.

DESCRIPTION OF THE DISCLOSURE

Figure 1:
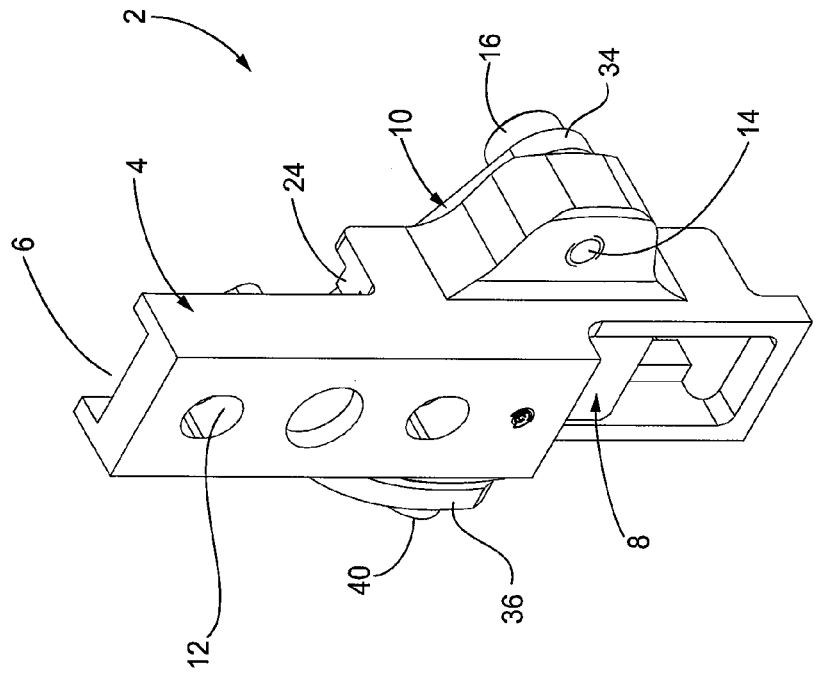
FIG. 1 is a front perspective view of an adjustment arrangement for an empty/load valve according to one aspect of the present disclosure.
Figure 2:
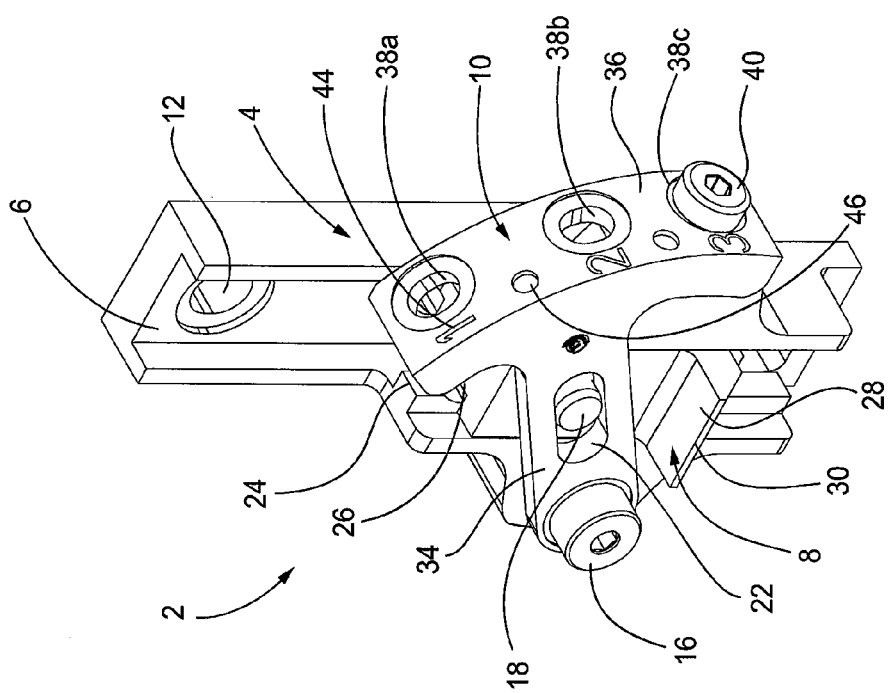
FIG. 2 is a rear perspective view of the adjustment arrangement of FIG. 1.
Figure 3:
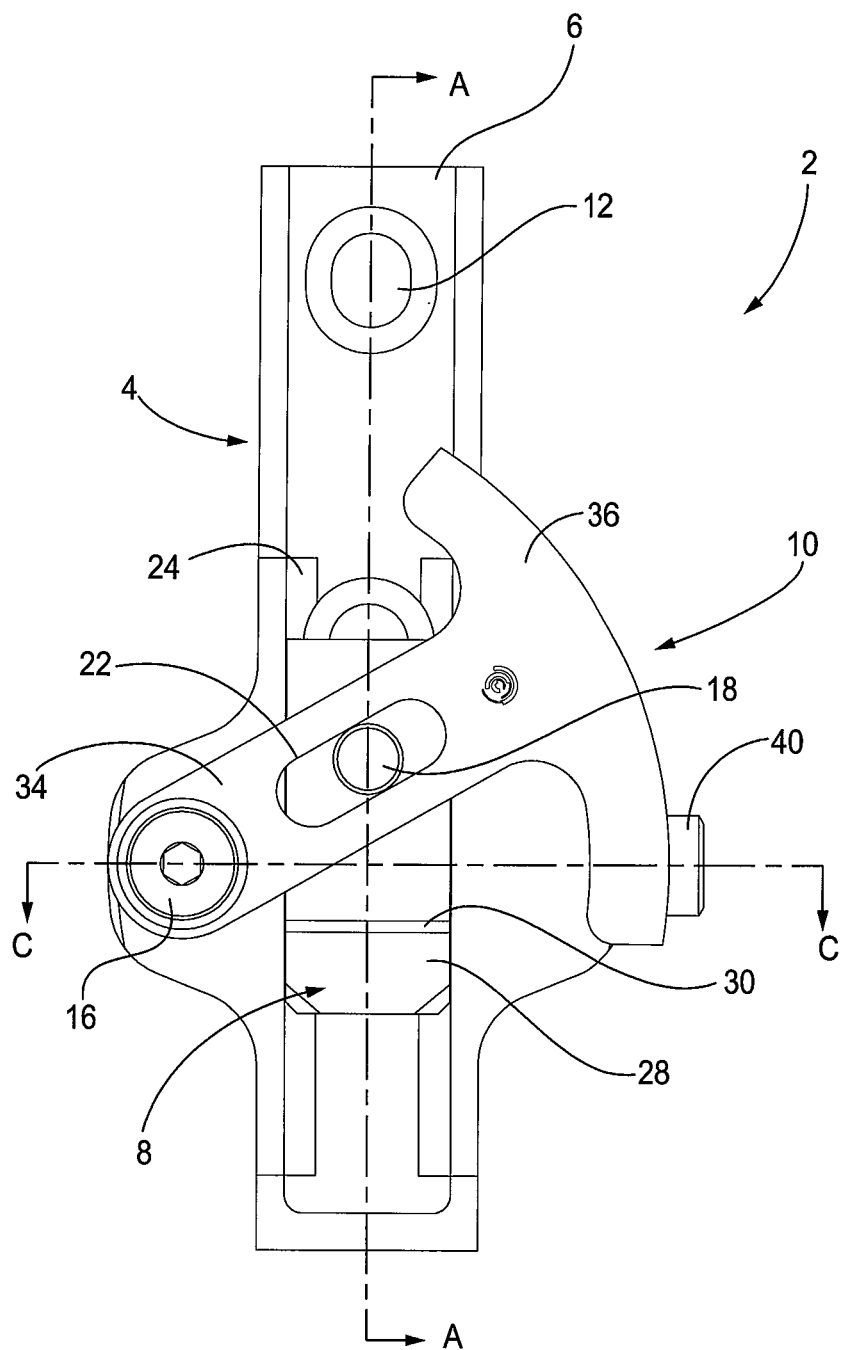
FIG. 3 is a front view of the adjustment arrangement of FIG. 1.
Figure 4:
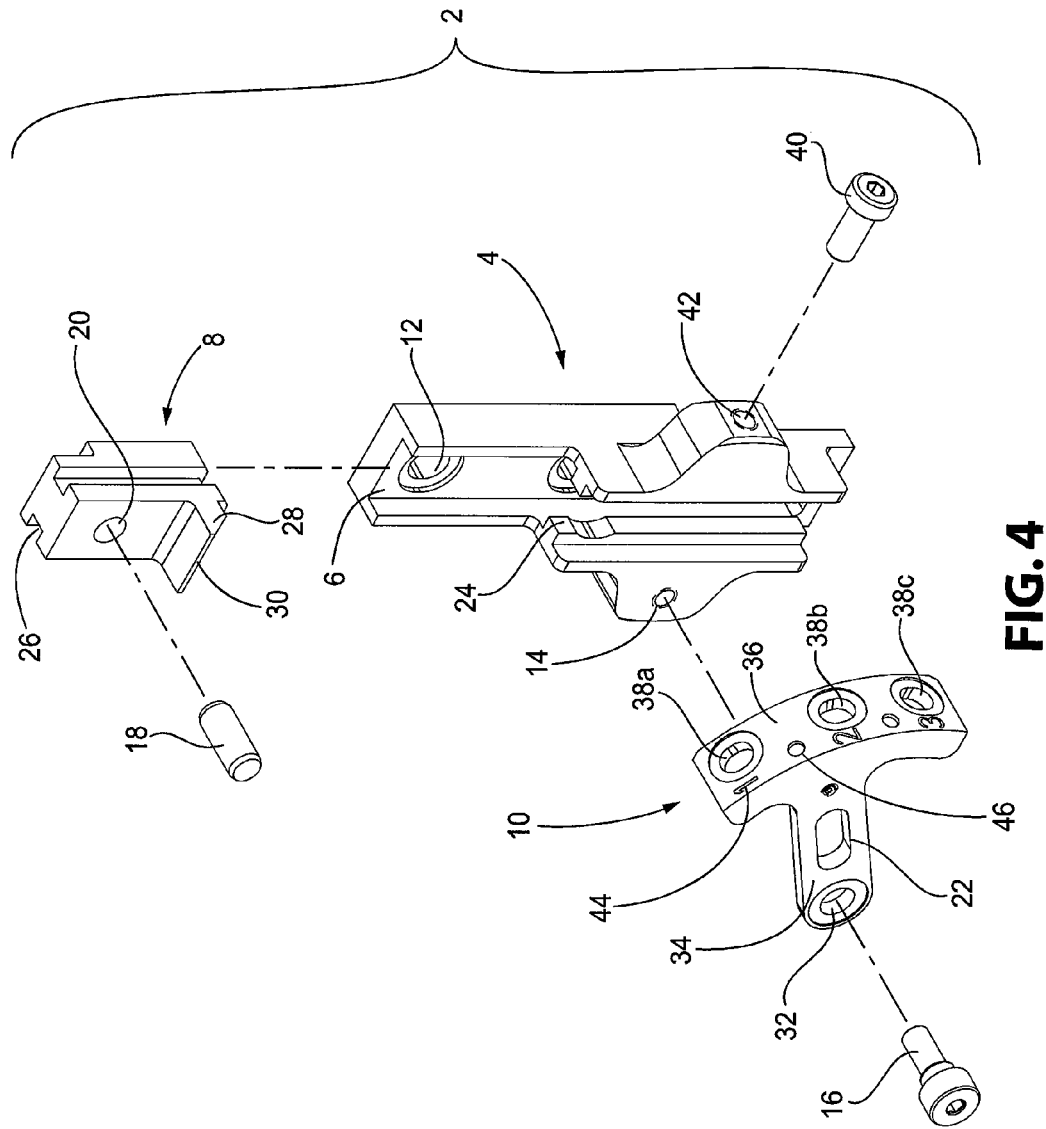
FIG. 4 is an assembly drawing of the adjustment arrangement of FIG. 1.
Figure 5:
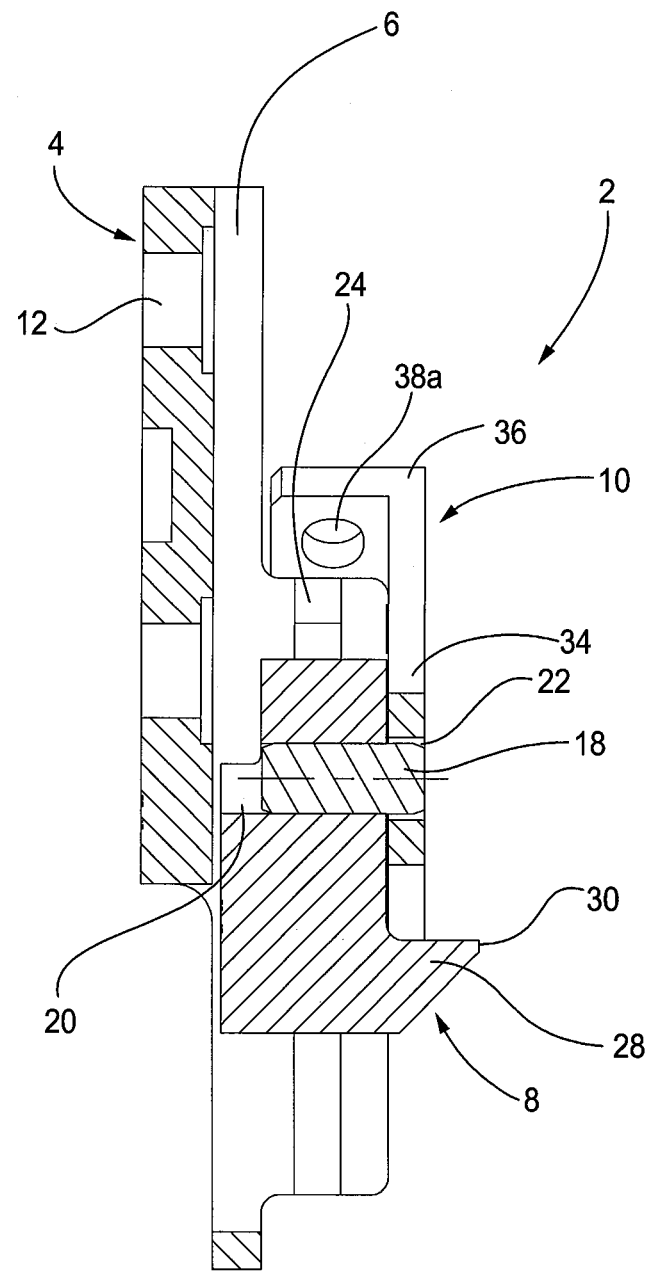
FIG. 5 is a cross-sectional view of the adjustment arrangement of FIG. 1 taken along line A-A of FIG. 3.
Figure 6:
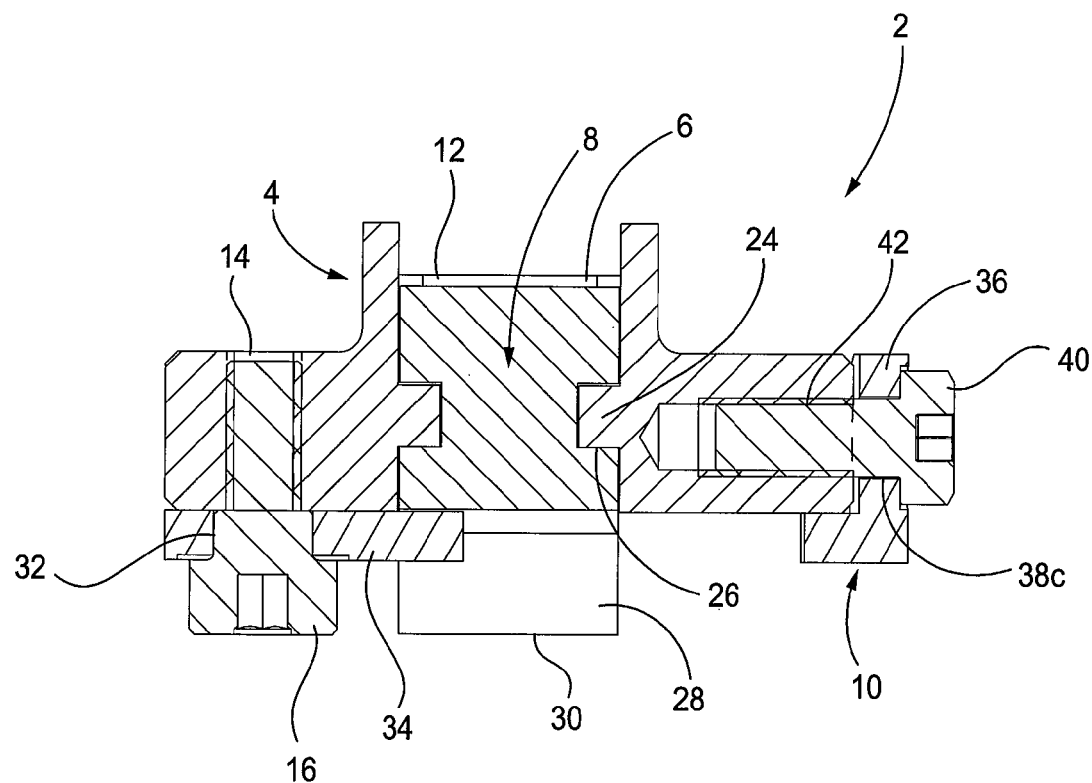
FIG. 6 is a cross-sectional view of the adjustment arrangement of FIG. 1 taken along line C-C of FIG. 3.
Figure 7:
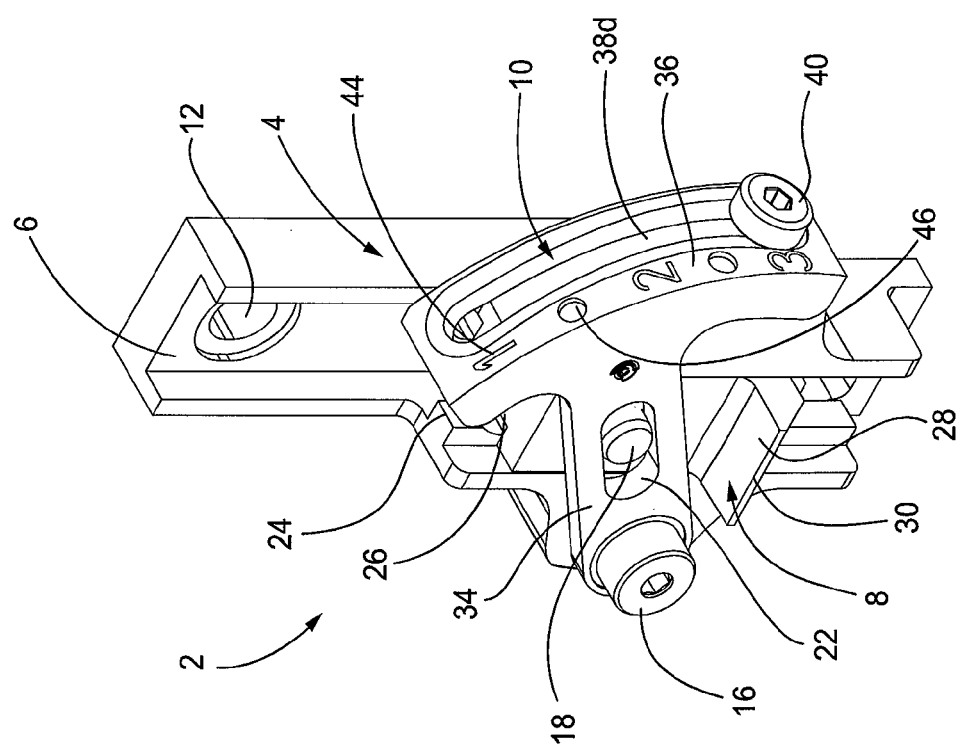
FIG. 7 is a front perspective view of an adjustment arrangement for an empty/load valve according to another aspect of the present disclosure.

For purposes of the description hereinafter, the terms "upper", "lower", "right", "left", "vertical", "horizontal", "top", "bottom", "lateral", "longitudinal", and derivatives thereof shall relate to the disclosure as it is oriented in the figures. However, it is to be understood that the disclosure may assume alternative variations and step sequences, except where expressly specified to the contrary. It is also to be understood that the specific devices and processes illustrated in the attached drawings, and described in the following specification, are simply exemplary aspects of the disclosure. Hence, specific dimensions and other physical characteristics related to the aspects disclosed herein are not to be considered as limiting.

The present disclosure is directed to, in general, an empty/load valve of a railway vehicle and, in particular, to an adjustment arrangement for the empty/load valve. Certain preferred and non-limiting aspects of the components of the adjustment arrangement and empty/load valve are illustrated in FIGS. 1-13.

With reference to FIGS. 1-6, an adjustment arrangement 2 for an empty/load valve of a railway vehicle according to one aspect of the disclosure is shown. The adjustment arrangement 2 includes a body 4 that defines a central channel 6, an adjustment beam 8 slidably positioned within the central channel 6, and an adjustment handle 10 secured to the body 4 and the adjustment beam 8. A rear surface of the body 4 defines a plurality of holes 12 to fasten the adjustment arrangement 2 to an empty/load valve (discussed below). The body 4 further defines another hole 14 to receive a fastening member 16, such as a bolt, that connects the adjustment handle 10 to the body 4. The adjustment handle 10 is connected to the body 4 in such a manner so as to allow the adjustment handle 10 to rotate about the fastening member 16 relative to the body 4. At least a portion of the adjustment beam 8 is positioned within the channel 6 defined by the body 4, such that the adjustment beam 8 may slide to different heights or locations within the channel 6. The adjustment beam 8 is connected to the adjustment handle 10 via a pin 18 that extends into a hole 20 defined in the adjustment beam 8 and a slot 22 defined in the adjustment handle 10 (shown in FIG. 5). The pin 18 may be press-fit into the hole 20 defined by the adjustment beam 8. Using this connection arrangement, as the adjustment handle 10 is rotated, the adjustment beam 8 is moved upward or downward in the channel 6.

The body 4 is generally rectangular in shape and is configured to hold the adjustment beam 8 within the channel 6. The body 4 includes a pair of opposing protrusions 24 that extend along a longitudinal length of the body 4 and into the channel 6. The protrusions 24 are configured to slidably retain the adjustment beam 8 within the channel 6. The adjustment beam 8 defines an opposing pair of channels 26 that correspond to the protrusions 24 extending from the body 4. With this arrangement, the protrusions 24 are received within the channels 26 to hold the adjustment beam 8 in the channel 6 of the body 4. The adjustment beam 8 also includes a protrusion 28 that extends outwardly away from the channel 6 of the body 4. The protrusion 28 defines a contact point 30 that contacts a beam of an empty/load valve (discussed below) to act as a fulcrum for the adjustment arrangement 2.

The adjustment handle 10 is configured to adjust the position of the adjustment beam 8 relative to the body 4. The adjustment handle 10 is connected to the body 4 via a fastening member 16 that extends through a hole 32 defined on a base 34 of the adjustment handle 10 and into the body 4 (shown in FIG. 6). The adjustment handle 10 also defines the slot 22 that receives the pin 18 to form a connection with the adjustment beam 8. The adjustment handle 10 includes an arm portion 36 that extends perpendicular to the base 34 to allow for adjustment of the handle 10 externally from the empty/load valve. The arm portion 36 has a slightly curved profile and defines a plurality of holes 38a-38c that correspond to different positions of the adjustment beam 8. In one aspect, the arm portion 36 defines three holes 38a-38c. The holes 38a-38c extend through the arm portion 36. A first hole 38a corresponds to a first position of the adjustment beam 8, a second hole 38b corresponds to a second position of the adjustment beam 8, and a third hole 38c corresponds to a third position of the adjustment beam 8. In one aspect, each position may correspond to a specific type of railway freight car (i.e., first position—freight cars weighing 20-22 tons, second position—freight cars weighing 22-27 tons, and third position—freight cars weighing over 27 tons). The three positions are located to give the optimal amount of brake cylinder pressure for each pre-determined freight car weight. The adjustment handle 10 is held in place relative to the body 4 by inserting a fastener 40, such as a bolt, through one of the holes 38a-38c and into a hole 42 defined in the body 4 (shown in FIG. 6). The adjustment handle 10 may be adjusted by an operator to move the arm portion 36 into different positions to change the position of the adjustment beam 8. In one aspect, the third position of the adjustment beam 8 moves the adjustment beam 8 to a higher position within the channel 6 than the second position of the adjustment beam 8. The second position of the adjustment beam 8 moves the adjustment beam 8 to a higher position within the channel 6 than the first position of the adjustment beam 8. In this aspect, when the adjustment beam 8 is positioned at the third hole 38c, the adjustment beam 8 is moved to its highest position. When the adjustment beam 8 is positioned at the second hole 38b, the adjustment beam 8 is moved to its intermediate position. When the adjustment beam 8 is positioned at the first hole 38a, the adjustment beam 8 is moved to its lowest position. Using this arrangement, the adjustment handle 10 may be moved to pre-determined positions that correspond to the amount of air that is supplied through the empty/load valve. It is also contemplated that more or fewer holes may be provided on the arm portion 36 to correspond to a different number of adjustment beam 8 positions. In another aspect shown in FIG. 7, instead of providing the holes 38a-38c on the arm portion 36, a single slot 38d may be defined in the arm portion 36 that provides continuous adjustment of the position of the adjustment handle 10. The operator may adjust the position of the adjustment handle 10 to anywhere along the length of the slot 38d.

A numerical indicator 44 may be provided next to each hole 38a-38c to notify an operator in which position the adjustment handle 10 is provided. It is to be understood, however, that the numerical indicator could be any type of indicator that notifies the operator of the position of the adjustment handle 10, such as a corresponding number of dots or lines, a shaped indicator (square, triangle, circle, etc.), or color indicators. The arm portion 36 also includes at least two dimples or holes 46 that are configured to assist an operator in moving the adjustment handle 10 to the different positions. When the adjustment arrangement 2 is installed in an empty/load valve, the operator may insert a screwdriver or similar type of instrument to engage the holes 46. Once the screwdriver has engaged the specific hole 46, the operator can rotate the screwdriver upwards or downwards to move the adjustment handle 10 to a different position. In one aspect, a hole 46 is defined between the first hole 38a and the second hole 38b and another hole is defined between the second hole 38b and the third hole 38c.

Figure 8:
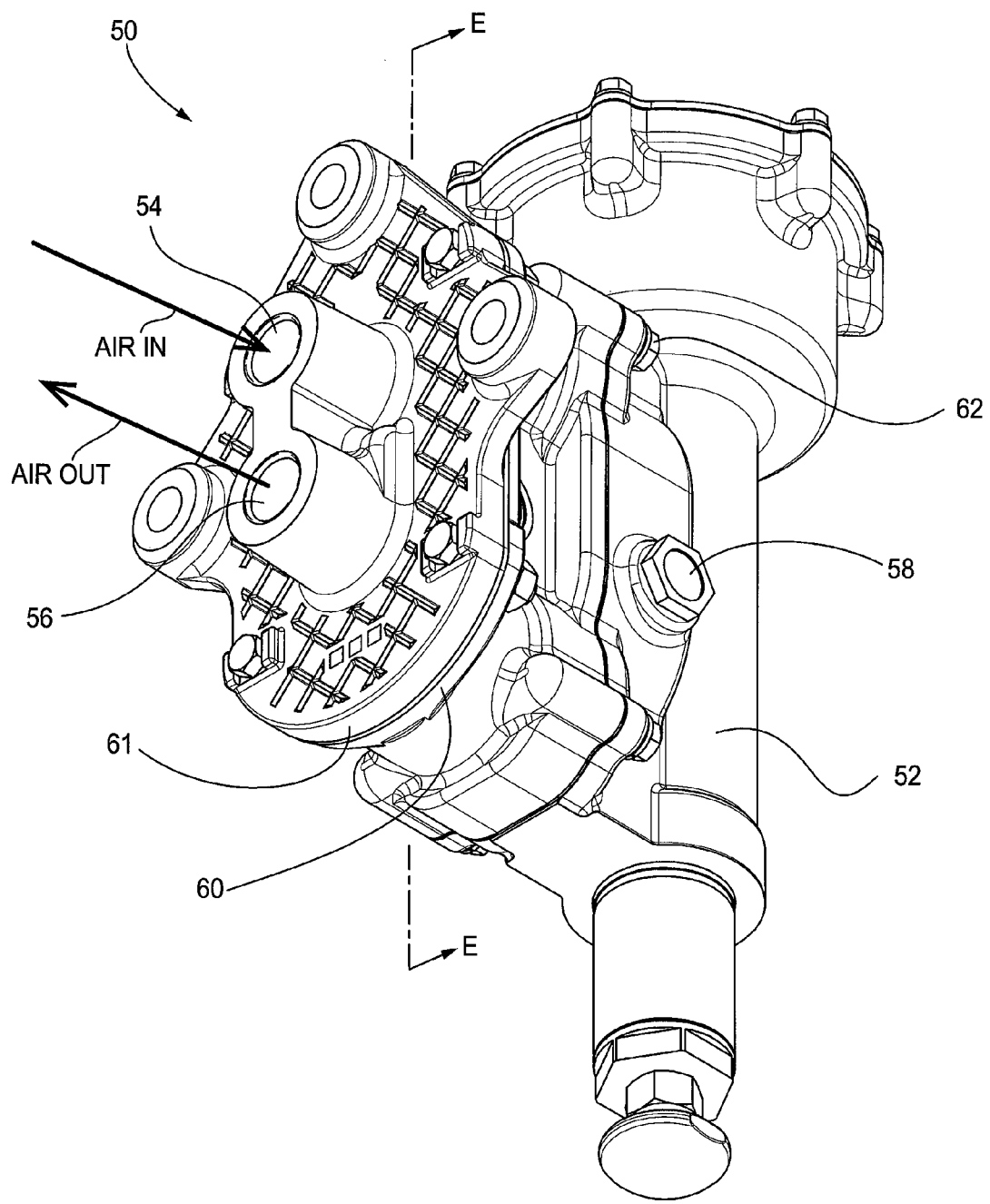
FIG. 8 is a front perspective view of an empty/load valve according to one aspect of the present disclosure.
Figure 9:
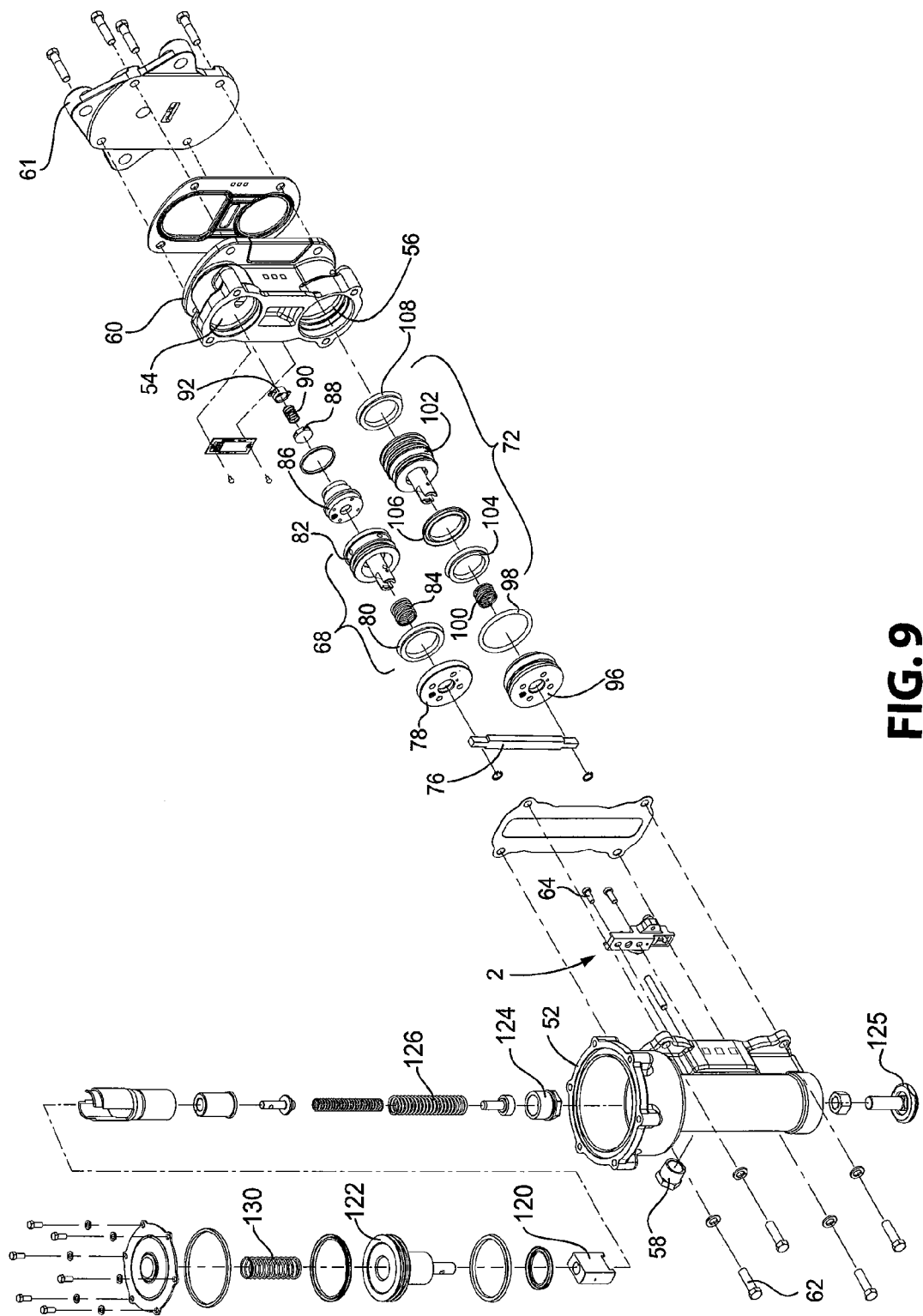
FIG. 9 is an assembly drawing of the empty/load valve of FIG. 8.
Figure 10:
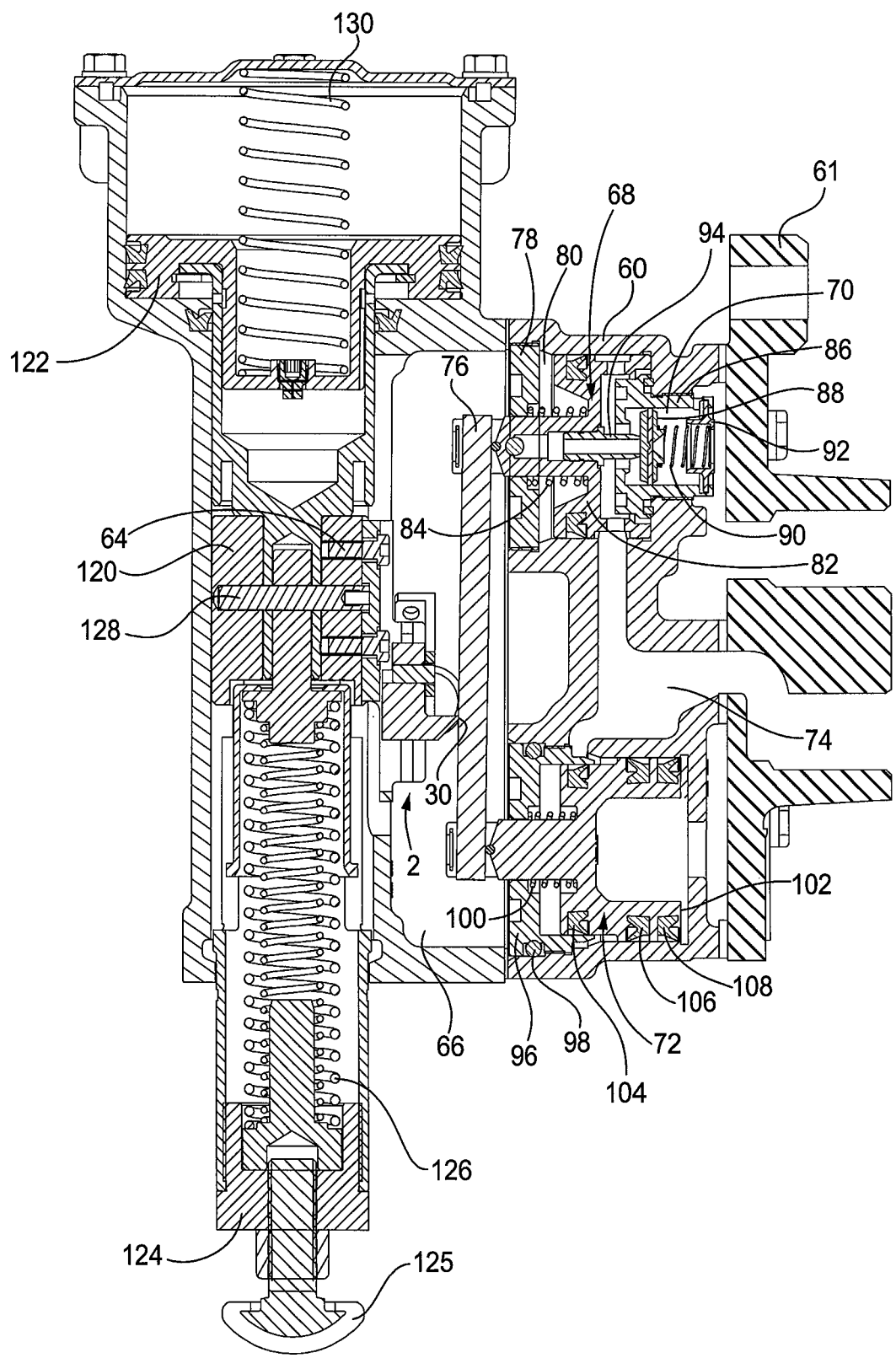
FIG. 10 is a cross-sectional view of the empty/load valve of FIG. 8 taken along line E-E.

With reference to FIGS. 8-10, an empty/load valve 50 including the adjustment arrangement 2 according to one aspect is shown. The empty/load valve 50 includes a housing 52 and a body member 60 with an inlet 54 for receiving pressurized air and an outlet 56 for releasing pressurized air. The empty/load valve 50 is configured to regulate the amount of pressurized air that is supplied to the brake cylinders of a railway vehicle brake system (discussed below). A sight plug 58 may also be removably provided in the housing 52 to allow an operator to look inside the empty/load valve 50 to determine the position of the adjustment handle 10. The body member 60 may be removably attached to the housing 52 via fasteners 62. A cover plate 61 is removably fastened onto the body member 60 via fasteners to contain the components of the empty/load valve 50 within the body member 60.

With reference to FIGS. 9 and 10, the adjustment arrangement 2 is fastened within the housing 52 of the empty/load device 50 by inserting fasteners 64 through the holes 12 on the body 4 of the adjustment arrangement 2 and into a guide member 120 of a sensor/damper arrangement that will be described in greater detail below. The adjustment arrangement 2 may be provided in a first chamber 66 of the empty/load device 50. The adjustment beam 8 may be moved to different positions within the first chamber 66 by rotating the adjustment handle 10.

A first check valve assembly 68 may be provided in an upper portion of a second chamber 70 of the housing 52 and a second check valve assembly 72 may be provided in a lower portion of the second chamber 70 of the housing 52. A third chamber 74 may also be provided in the housing 52. The first check valve assembly 68 is connected to the second check valve assembly 72 via a lever 76 provided in the first chamber 66 of the housing 52. The lever 76 may abut the contact point 30 of the adjustment beam 8. The contact point 30 may act as a fulcrum about which the lever 76 may rotate. As the check valve assemblies 68, 72 are moved within the second chamber 70, the lever 76 is rotated about the contact point 30 of the adjustment beam 8.

The first check valve assembly 68 includes, a sealing member 80, a plunger 82, and a spring member 84 provided around a portion of the plunger 82. A cap 78 is provided on one end of the first check valve assembly 68. A check valve seat 86, a check valve disc 88, and a spring member 90 provided within a spring retainer 92 are provided on an opposing end of the first check valve assembly 68. The spring member 90 is provided between the check valve disc 88 and the spring retainer 92. The second check valve assembly 72 includes a plunger 102 and a spring member 100 provided on a portion of a plunger 102. A cap 96 and sealing member 98 are provided on one end of the second check valve assembly 72. A plurality of additional sealing members 104-108 are also provided on the plunger 102. The lever 76 provided in the first chamber 66 is connected to each plunger 82, 102 via a pin connection. With this arrangement, as one check valve assembly 68, 72 moves in one direction, the other check valve assembly 68, 72 moves in an opposite direction due to the lever and fulcrum arrangement created with the lever 76 and contact point 30 of the adjustment beam 8. Based on the location of the contact point 30 on the lever 76, a mechanical advantage is created for moving the check valve assemblies 68, 72.

Figure 11:
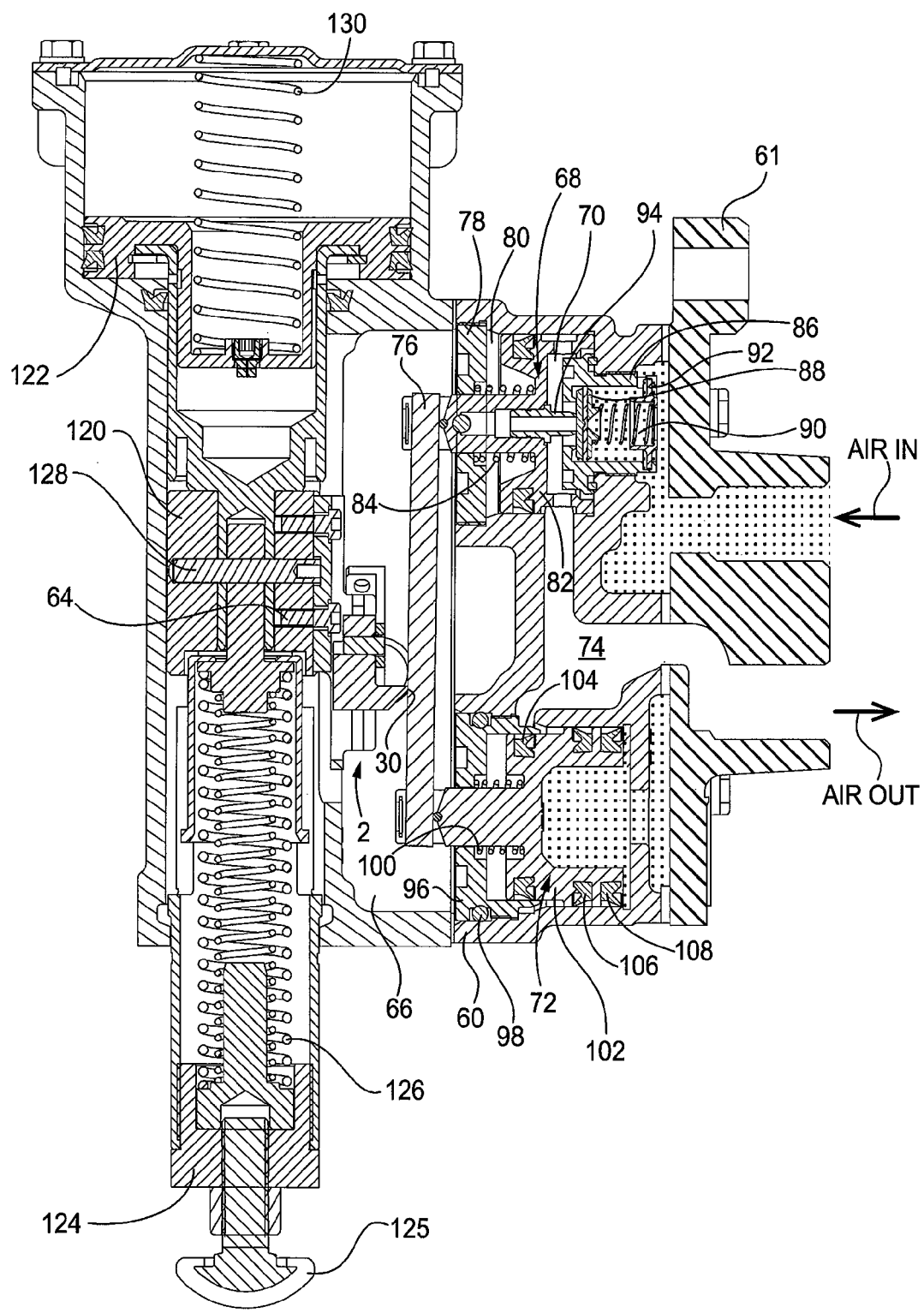
FIG. 11 is a cross-sectional view of the empty/load valve of FIG. 8 taken along line E-E with the empty/load valve shown in an empty position.
Figure 12:
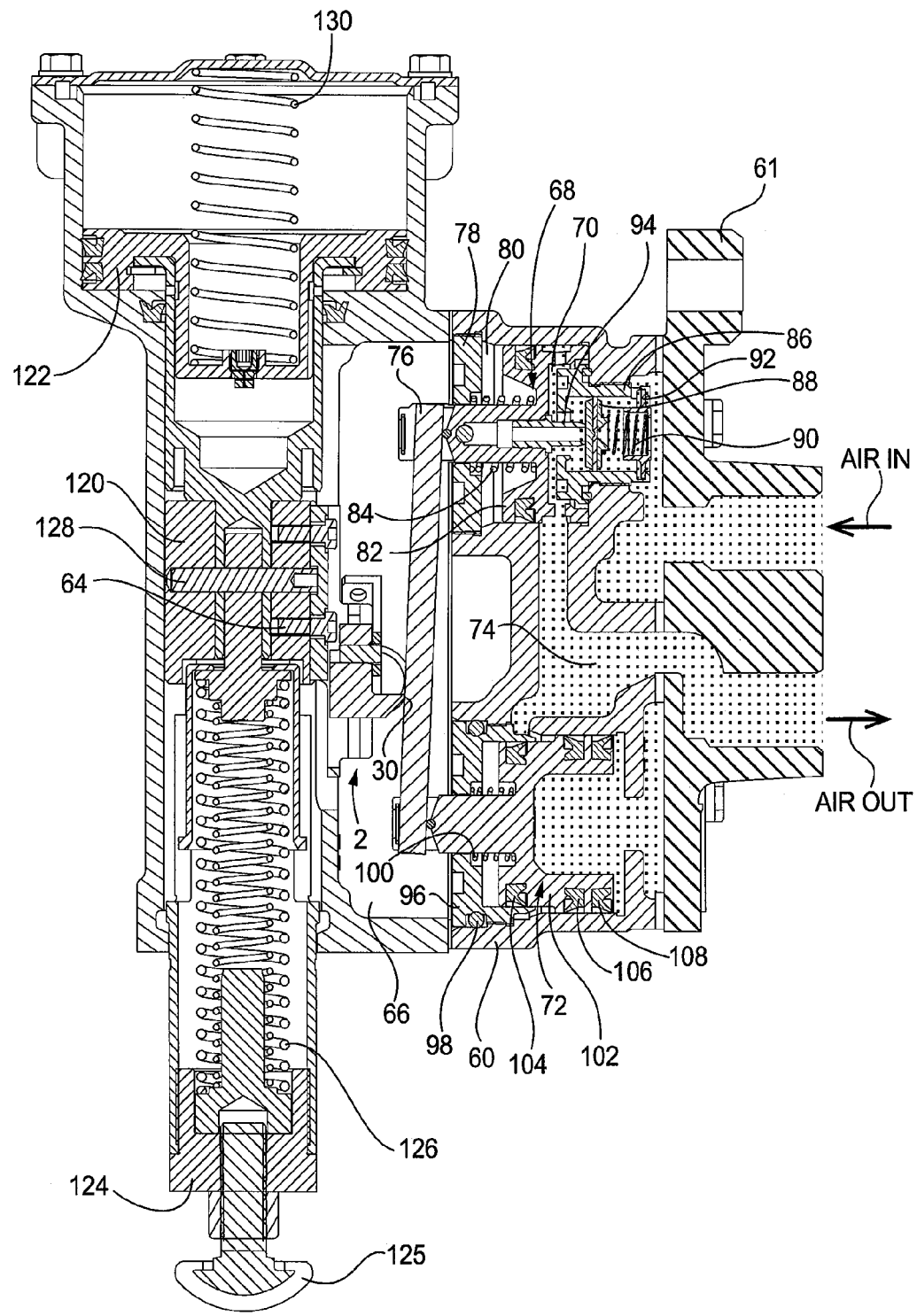
FIG. 12 is a cross-sectional view of the empty/load valve of FIG. 8 taken along line E-E with the empty/load valve shown in an intermediate position.
Figure 13:
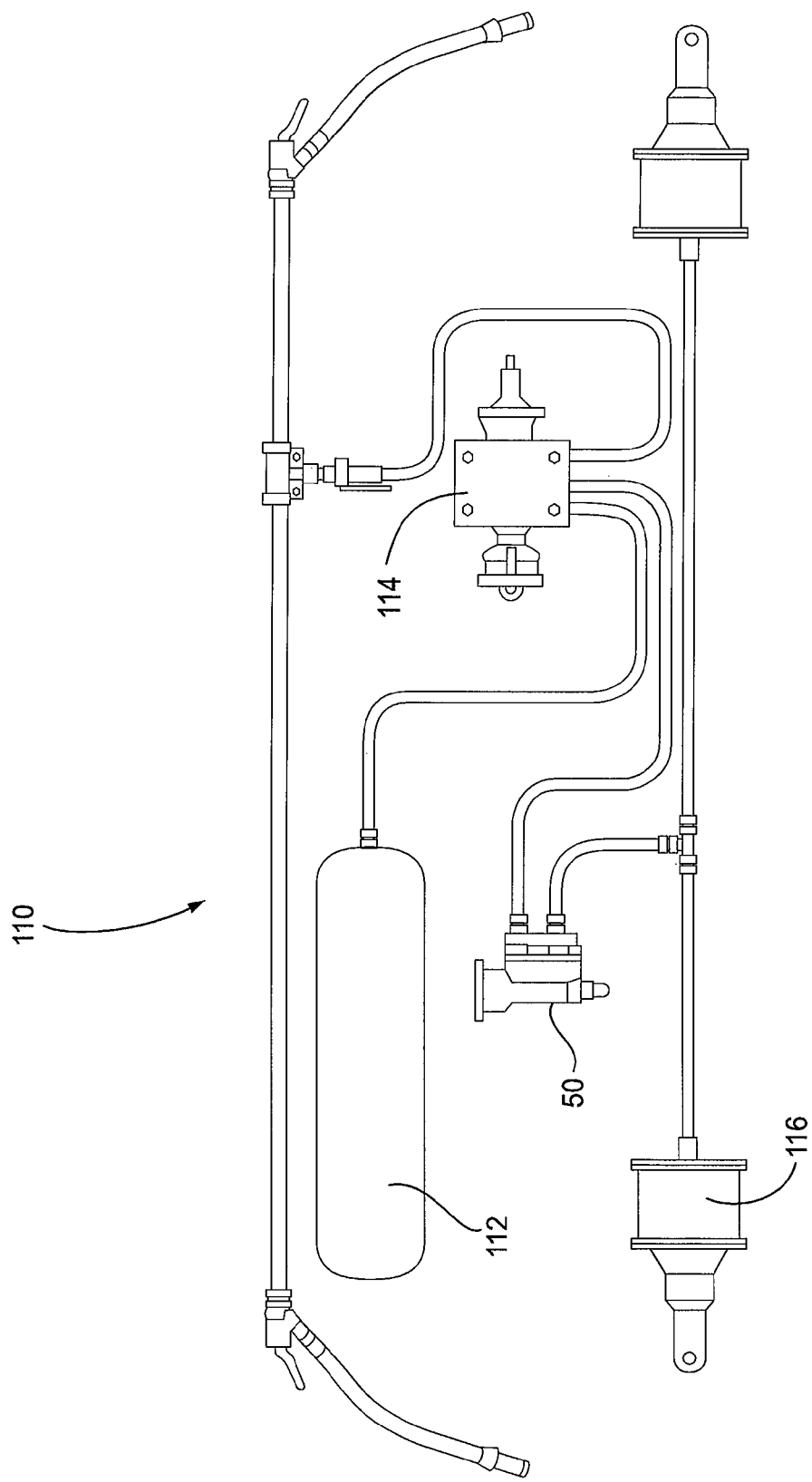
FIG. 13 is a schematic drawing of a braking assembly of a railway freight car.

With reference to FIGS. 11-13, a method of using an empty/load valve 50 with an adjustment feature 2 is described. A braking assembly 110 for a railway freight car may include a supply reservoir 112 fluidly connected to a distributor valve 114. Pressurized fluid may be directed from the supply reservoir 112, through the distributor valve 114, and into the empty/load valve 50. The empty/load valve 50 regulates the amount of pressurized air that is supplied from the distributor valve 114 to the brake cylinders 116 of the railway freight car based on the weight of the railway freight car. Using the adjustment arrangement 2 in the empty/load valve 50, the amount of pressurized air supplied to the brake cylinder 116 is regulated. Pressurized air (represented as dots in FIGS. 11 and 12) from the distributor valve 114 is supplied to the inlet 54 of the empty/load valve 50 and into the second chamber 70 of the empty/load valve 50. The pressurized air pushes against both check valve assemblies 68, 72. The position of the contact point 30 located on the lever 76 will determine the amount of pressurized air that is directed through the outlet 56 of the empty/load valve 50.

As shown in FIG. 12, as the pressurized air enters the second chamber 70, the second check valve assembly 72 is pushed to the left to move the bottom portion of the lever 76 around the contact point 30 due to the mechanical advantage created by the contact point 30 acting as a fulcrum. In one aspect, the lever 76 is rotated in a clockwise direction around the contact point 30. As the lever 76 is rotated clockwise, the top portion of the lever 76 pushes the first check valve assembly 68 towards the right. Likewise, the plunger 82, which is pin connected to the lever 76, is also pushed to the right. As the plunger 82 is pushed to the right, a rod 94 of the check valve seat 86 is also pushed to the right. The check valve disc 88 is lifted from the check valve seat 86 and compresses the spring member 90. Once the check valve disc 88 is lifted from the check valve seat 86, the pressurized air is permitted to flow into the third chamber 74. The pressurized air is then directed from the outlet 56 and into the brake cylinders 116.

The adjustment arrangement 2 is used to adjust the amount of pressurized air that is supplied to the brake cylinders 116. By adjusting the height of the adjustment beam 8 within the first chamber 66, the contact point 30 location on the lever 76 is also adjusted. With the adjustment of the contact point 30 location, the mechanical advantage provided to the second check valve assembly 72 to rotate the lever 76 is also adjusted. Therefore, the lower the contact point 30 is positioned on the lever 76, a reduced amount of mechanical advantage is provided to the second check valve assembly 72 to rotate the lever 76. Therefore, with less mechanical advantage, the check valve disc 88 is moved a smaller distance from the check valve seat 86, only allowing a small amount of pressurized air to escape from the empty/load valve 50. The check valve disk 88 becomes unseated from the check valve seat 86 and the pressure entering the third chamber 74 requires a lower pressure acting on plunger 82 to balance the beam 76 and thus, allows the check valve disc 88 to re-seat on the check valve seat 86. This allows for separation of air in and out of the empty/load device 50. This position of the adjustment arrangement 2 would be used for an empty freight car. The smaller the distance between the contact point 30 and the bottom of the lever 76 at which the second check valve assembly 72 is connected, the smaller the amount of mechanical advantage that is created to rotate the lever 76. Conversely, more mechanical advantage is created when the contact point 30 is positioned higher on the lever 76. The greater the distance between the contact point 30 and the bottom of the lever 76 at which the second check valve assembly 72 is connected, the greater amount of mechanical advantage that is created to rotate the lever 76.

As shown in FIGS. 9-12, a sensor/damper arrangement may be provided on the empty/load valve 50. The sensor/damper arrangement may be provided in the housing 52 and include a guide member 120, a damper 122, and a sensor member 124. The damper 122 and sensor member 124 may be connected to the guide member 120 via a connecting pin 128 that extends through the guide member 120, the damper 122, and the sensor member 124. One end of the connecting pin 128 may rest within a cavity defined in the adjustment arrangement 2. Therefore, as the sensor/damper arrangement moves vertically within the housing 52, the adjustment arrangement 2 is also moved vertically via the connection to the sensor/damper arrangement. A resilient member 126 may be provided on the sensor member 124. In one aspect, the resilient member 126 may be a spring. Further, a sensor button 125 may be connected to the sensor member 124. Similarly, another resilient member 130 may be provided on the damper 122. In one aspect, the resilient member 130 may be a spring. The resilient members 126, 130 are biased against one another and create a lap position for the guide member 120. As the sensor button 125 is pushed upward, the resilient member 126 pushes the guide member 120 upwards. As the guide member 120 is moved upwards, the adjustment arrangement 2 is also moved upwards, which moves the contact point 30 on the beam 76. This movement of the adjustment arrangement 2 assists in adjusting the position of the contact point 30 on the beam 76 to accommodate the load provided on the railway vehicle. The resilient member 130 and damper 122 push downwards on the guide member 120 so that the guide member 120 is only moved upwards upon a sufficient upward force on the sensor button 125. Therefore, small forces exerted on the sensor button 125, such as those created by bumps on the tracks on which the railway vehicle is traveling, will not overcome the downward force of the damper 122 and resilient member 130 to move the guide member 120 upwards.

To adjust the height of the contact point 30 on the lever 76, an operator may use the adjustment arrangement 2. To access the adjustment arrangement 2 within the empty/load valve 50, the operator will remove the sight plug 58 on the housing 52 of the empty/load valve 50. The sight plug 58 may include a clear screen, such as glass or plastic, that allows the operator to look into the empty/load valve 50 to determine the position at which the adjustment arrangement 2 is provided. After the sight plug 58 has been removed, the operator may remove the fastener 40 that is inserted into one of the holes 38a-38c defined in the arm portion 36 of the adjustment handle 10. The operator may then insert a screwdriver or similar instrument into the empty/load valve 50 to contact the arm portion 36 of the adjustment handle 10. In particular, the operator may insert or contact the holes 46 on the arm portion 36 to rotate the adjustment handle 10 about the fastening member 16. The operator may rotate the arm portion 36 to align one of the three holes 38a-38c with the hole provided in the housing 52. As the arm portion 36 is rotated, the base 34 is also rotated. The rotation of the base 34 causes the adjustment beam 8 to move to a new position via the pin 18.

In an event in which the empty railway freight car has a light tare weight, the operator may move the adjustment handle 10 to the first position or first hole 38a so that the adjustment beam 8 and contact point 30 are positioned lower on the lever 76. By being positioned lower on the lever 76, less air is directed out of the empty/load valve 50 due to the reduced mechanical advantage provided by the location of the contact point 30. In an event in which the empty railway freight car has an intermediate tare weight, the operator may move the adjustment handle 10 to the second position or second hole 38b so that the adjustment beam 8 and contact point 30 are positioned at an intermediate location on the lever 76. By being positioned at an intermediate location on the lever 76, a moderate amount of air is directed out of the empty/load valve 50 due to the moderate mechanical advantage provided by the location of the contact point 30. In an event in which the empty railway freight car has a heavy tare weight, the operator may move the adjustment handle 10 to the third position or third hole 38b so that the adjustment beam 8 and contact point 30 are positioned at an upper location on the lever 76. By being positioned at an upper location on the lever 76, an increased amount of air is directed out of the empty/load valve 50 due to the improved mechanical advantage provided by the location of the contact point 30. It is contemplated that adjustment of the adjustment arrangement 2 may be performed by the operator at the time of installation of the empty/load valve 50 on the railway vehicle or, alternatively, may be adjusted by the operator in the field, as desired. The adjustment of the adjustment arrangement 2 is made when the railway freight car is empty so that the adjustment arrangement 2 aligns with the sight plug 58. The adjustment is made depending on the tare weight of the empty railway freight car, not the weight of the material being loaded into the railway freight car. This allows for a single valve to be used on multiple types of railway freight cars (e.g., Position 1 for tare weight of 20-22 tons, Position 2 for tare weight of 22-27 tons, and Positions for tare weights over 27 tons). All adjustment positions work with the railway freight car empty, intermediate, or fully loaded. Air is only regulated when a railway freight car is empty or intermediately loaded and the full amount of air is used when the railway freight car is fully loaded.

After the operator has chosen the desired position for the adjustment arrangement 2, the operator will withdraw the screwdriver from the empty/load valve 50 and insert the fastener 40 into the selected hole 38a-38c on the adjustment handle 10. The fastener 40 will lock the adjustment arrangement 2 into position within the empty/load valve 50 to correspond to the tare weight of the railway freight car. The sight plug 58 is then friction fit back into the empty/load valve 50. Using the adjustment arrangement 2 with the empty/load valve 2, the operator is able to adjust the amount of pressurized air that is supplied to the brake cylinders 116 based on the tare weight of the railway freight car while the operator is in the field. The operator is not required to return to a maintenance station or garage to adjust the settings of the empty/load valve 50. By providing the predetermined positions for the adjustment beam 8, the brake cylinder 116 pressure is known at each position without having the need to retest the empty/load valve 50 after adjustment.

While various aspects of the adjustment arrangement 2 and empty/load valve 50 were provided in the foregoing description, those skilled in the art may make modifications and alterations to these aspects without departing from the scope and spirit of the invention. For example, it is to be understood that this disclosure contemplates that, to the extent possible, one or more features of any aspect can be combined with one or more features of any other aspect. Accordingly, the foregoing description is intended to be illustrative rather than restrictive. The invention described hereinabove is defined by the appended claims and all changes to the invention that fall within the meaning and the range of equivalency of the claims are to be embraced within their scope.

The invention claimed is:

1. An adjustment arrangement for an empty/load valve, comprising:
a body defining a channel;
an adjustment beam slidably retained within the channel; and
an adjustment handle connected to the adjustment beam, wherein the adjustment handle is configured to move between at least two positions, and
wherein the adjustment handle is configured to move the adjustment beam to at least two positions, wherein the adjustment handle defines at least two holes that correspond to the at least two positions of the adjustment handle.

2. The adjustment arrangement as claimed in claim 1, wherein the adjustment handle is connected to the adjustment beam via a pin that extends through the adjustment handle and into the adjustment beam.

3. The adjustment arrangement as claimed in claim 1, wherein the adjustment beam includes a protrusion that extends from the adjustment beam to act as a contact point.

4. The adjustment arrangement as claimed in claim 1, wherein the adjustment handle is configured to move between at least three positions that each correspond to a weight of a railway vehicle.

5. The adjustment arrangement as claimed in claim 1, wherein the adjustment handle is secured to the body via a fastener at each position.

6. The adjustment arrangement as claimed in claim 1, wherein the adjustment handle further comprises at least one indicator provided next to each hole.

7. The adjustment arrangement as claimed in claim 1, wherein the adjustment handle defines at least one dimple that is used to rotate the adjustment handle between the at least two positions.

8. The adjustment arrangement as claimed in claim 1, wherein the body comprises two opposing protrusions and the adjustment beam defines two opposing channels, and
wherein the protrusions of the body are received within the channels of the adjustment beam to slidably retain the adjustment beam on the body.

9. An empty/load valve for a railway vehicle, comprising:
a housing and body member;
a first check valve assembly positioned within the body member;
a second check valve assembly positioned within the body member;
a lever configured to connect the first check valve assembly to the second check valve assembly; and
an adjustment arrangement provided within the housing, the adjustment arrangement comprising:
a body defining a channel;
an adjustment beam slidably retained within the channel; and
an adjustment handle connected to the adjustment beam,
wherein the adjustment handle is configured to move between at least two positions, and
wherein the adjustment handle is configured to move the adjustment beam to at least two positions on the lever.

10. The empty/load valve as claimed in claim 9, wherein the adjustment beam includes a protrusion that extends from the adjustment beam to act as a contact point against the lever.

11. The empty/load valve as claimed in claim 10, wherein the contact point moves between different heights on the lever upon movement of the adjustment beam.

12. The empty/load valve as claimed in claim 9, further comprising a sight plug inserted into the housing that allows an operator to view the adjustment arrangement within the housing.

13. The empty/load valve as claimed in claim 9, wherein the adjustment handle is connected to the adjustment beam via a pin that extends through the adjustment handle and into the adjustment beam.

14. The empty/load valve as claimed in claim 9, further comprising a sensor/damper arrangement provided in the housing, wherein the adjustment arrangement is connected to the sensor/damper arrangement.

15. The empty/load valve as claimed in claim 9, wherein, upon movement of the first check valve assembly in a first direction, the lever is rotated to move the second check valve assembly in an opposing second direction, and wherein the adjustment beam acts as the fulcrum point for the lever.

16. A railway vehicle, comprising:
a supply reservoir fluidly connected to a distributor valve;
an empty/load valve fluidly connected to the distributor valve; and
a brake cylinder fluidly connected to the empty/load valve,
wherein the empty/load valve comprises:
a housing and body member;
a first check valve assembly positioned within the body member;
a second check valve assembly positioned within the body member;
a lever configured to connect the first check valve assembly to the second check valve assembly; and
an adjustment arrangement provided within the housing, wherein the adjustment arrangement comprises:
a body defining a channel;
an adjustment beam slidably retained within the channel; and
an adjustment handle connected to the adjustment beam,
wherein the adjustment handle is configured to move between at least two positions, and
wherein the adjustment handle is configured to move the adjustment beam to at least two positions on the lever.

17. The railway vehicle as claimed in claim 16, wherein the empty/load valve regulates an amount of pressurized fluid that is supplied to the brake cylinder by adjusting the position of the adjustment beam on the lever of the empty/load valve.

18. The railway vehicle as claimed in claim 16, wherein a contact point extending from the adjustment beam moves between different heights on the lever upon movement of the adjustment beam to regulate an amount of pressurized fluid that is supplied from the empty/load valve.

19. The railway vehicle as claimed in claim 16, further comprising a sensor/damper arrangement provided in the housing, wherein the adjustment arrangement is connected to the sensor/damper arrangement.

\* \* \* \* \*